United States Patent
Zhu et al.

(10) Patent No.: US 12,333,389 B2
(45) Date of Patent: Jun. 17, 2025

(54) AUTONOMOUS VEHICLE SYSTEM FOR INTELLIGENT ON-BOARD SELECTION OF DATA FOR TRAINING A REMOTE MACHINE LEARNING MODEL

(71) Applicant: Volkswagen Group of America Investments, LLC, Reston, VA (US)

(72) Inventors: Shaojun Zhu, Pittsburgh, PA (US); Richard L. Kwant, San Bruno, CA (US); Nicolas Cebron, Sunnyvale, CA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 921 days.

(21) Appl. No.: 17/124,413

(22) Filed: Dec. 16, 2020

(65) Prior Publication Data

US 2022/0188695 A1  Jun. 16, 2022

(51) Int. Cl.
*G06N 20/00* (2019.01)

(52) U.S. Cl.
CPC .................... *G06N 20/00* (2019.01)

(58) Field of Classification Search
CPC .......... G06N 20/00; G06N 3/045; G06N 3/08; B60K 2370/175
See application file for complete search history.

(56) References Cited

U.S. PATENT DOCUMENTS

| | | |
|---|---|---|
| 7,793,188 B2 | 9/2010 | Mukhopadhyay et al. |
| 9,031,317 B2 | 5/2015 | Yakubovich et al. |
| 10,379,842 B2 | 8/2019 | Malladi et al. |
| 10,489,222 B2 | 11/2019 | Sathyanarayana et al. |

(Continued)

FOREIGN PATENT DOCUMENTS

| | | |
|---|---|---|
| CN | 111914944 A | 11/2020 |
| WO | 2020159568 A1 | 8/2020 |

OTHER PUBLICATIONS

D. Eldowa, K. Elgazzar, H. S. Hassanein, T. Sharaf and S. Shah, "Assessing the Integrity of Traffic Data through Short Term State Prediction," 2019 IEEE Global Communications Conference (GLOBECOM), Waikoloa, HI, USA, 2019, pp. 1-5, doi: 10.1109/GLOBECOM38437.2019.9013491. (Year: 2019).*

A. A. Sodemann, M. P. Ross and B. J. Borghetti, "A Review of Anomaly Detection in Automated Surveillance," in IEEE Transactions on Systems, Man, and Cybernetics, Part C (Applications and Reviews), vol. 42, No. 6, pp. 1257-1272, Nov. 2012, doi: 10.1109/TSMCC.2012.2215319. (Year: 2012).*

(Continued)

*Primary Examiner* — Kamran Afshar
*Assistant Examiner* — Lokesha G Patel
(74) *Attorney, Agent, or Firm* — Fox Rothschild LLP

(57) ABSTRACT

Systems and methods for on-board selection of data logs for training a machine learning model. The methods include, by an autonomous vehicle, receiving sensor data logs corresponding to surroundings of the autonomous vehicle from a plurality of sensors, identifying one or more events within each sensor data log. The methods also include, for each sensor data log: analyzing features of the identified one or more events within that sensor data log for determining whether that sensor data log satisfies one or more usefulness criteria for training a machine learning model, and transmitting that sensor data log to a remote computing device for training the machine learning model if that sensor data log satisfies one or more usefulness criteria for training the machine learning model. The features can include spatial features, temporal features, bounding box inconsistencies, or map-based features.

22 Claims, 5 Drawing Sheets

(56) References Cited

U.S. PATENT DOCUMENTS

| | | | |
|---|---|---|---|
| 10,499,283 | B2 | 12/2019 | Elias et al. |
| 11,657,591 | B2* | 5/2023 | Muehlenstaedt ...... G06V 10/82 |
| | | | 382/104 |
| 2006/0046711 | A1* | 3/2006 | Jung ................ H04W 4/38 |
| | | | 455/423 |
| 2016/0321561 | A1* | 11/2016 | Röder ................ G06N 20/20 |
| 2017/0011281 | A1 | 1/2017 | Dijkman et al. |
| 2017/0083792 | A1 | 3/2017 | Rodriguez-Serrano et al. |
| 2019/0258904 | A1 | 8/2019 | Ma et al. |
| 2020/0005083 | A1 | 1/2020 | Collins |
| 2020/0081426 | A1 | 3/2020 | Kane et al. |
| 2020/0111005 | A1 | 4/2020 | Ghosh et al. |
| 2020/0202171 | A1 | 6/2020 | Hughes et al. |
| 2020/0272854 | A1 | 8/2020 | Caesar |
| 2020/0286615 | A1 | 9/2020 | Hartung et al. |
| 2020/0380285 | A1 | 12/2020 | Price et al. |
| 2020/0382361 | A1 | 12/2020 | Chandrasekhar et al. |
| 2021/0125423 | A1* | 4/2021 | Isaac ................ G07C 5/008 |
| 2021/0129845 | A1 | 5/2021 | Bonk |
| 2021/0134379 | A1 | 5/2021 | Zhao |
| 2021/0156963 | A1* | 5/2021 | Popov ................ G06N 3/045 |
| 2021/0295201 | A1 | 9/2021 | Kim et al. |
| 2022/0164602 | A1* | 5/2022 | Frtunikj .............. G06F 18/2115 |
| 2023/0040068 | A1 | 2/2023 | Gandhi |

OTHER PUBLICATIONS

Castaño, F.; Beruvides, G.; Villalonga, A.; Haber, R.E. Self-Tuning Method for Increased Obstacle Detection Reliability Based on Internet of Things LiDAR Sensor Models. Sensors 2018, 18, 1508. https://doi.org/10.3390/s18051508 (Year: 2018).*

S. Thornton and S. Dey, "Machine Learning Techniques for Vehicle Matching with Non-Overlapping Visual Features," 2020 IEEE 3rd Connected and Automated Vehicles Symposium (CAVS), Victoria, BC, Canada, 2020, pp. 1-6, doi: 10.1109/CAVS51000.2020. 9334562. (Year: 2020).*

Zhang et al., "Edge-to-edge cooperative artificial intelligence in smart cities with on-demand learning offloading" (Year: 2019).*

Claviere et al., "Trajectory Tracking Control for Robotic Vehicles Using Counterexample Guided Training of Neural Networks" (Year: 2019).*

Bobbili, N. P., & Cretu, A. M. (Jun. 2018). Adaptive weighting with smote for learning from imbalanced datasets: a case study for traffic offence prediction. In 2018 IEEE International Conference on CIVEMSA (pp. 1-6) (Year: 2018).*

Dave, H., "Active Learning Sampling Strategies", available at https://towardsdatascience.com/active-learning-sampling-strategies-f8d8ac7037c8 accessed on Nov. 17, 2020.

Nvidia AI, "Scalable Active Learning for Autonomous Driving", Dec. 18, 2019, available at https://medium.com/nvidia-ai/scalable-active-learning-for-autonomous-driving-a-practical-implementation-and-a-b-test-4d315ed04b5f accessed Nov. 17, 2020.

Wei, X., "Deep Active Learing for 3D Object Detection for Autonomous Driving", Degree Project in Computer Science and Engineering, Second Cycle, Stockholm, Sweden, Nov. 22, 2019, available at http://www.diva-portal.org/smash/get/diva2:1415945/FULLTEXT01.pdf.

Liu, S. et al., "Edge Computing for Autonomous Driving: Opportunities and Challenges", Proceedings of the IEEE, vol. 107, No. 8, Aug. 2019, available at http://weisong.eng.wayne.edu/_resources/pdfs/liu19-EdgeAV.pdf.

Cai, S. et al., "Data Collection in Underwater Sensor Networks Based on Mobile Edge Computing", IEEE Access, (2019) vol. 7, pp. 65357-65367, available at https://ieeexplore.ieee.org/stamp/stamp.jsp?arnumber=8719985.

Information about Related Patents and Patent Applications, see section 6 of the accompanying Information Disclosure Statement Letter, which concerns Related Patents and Patent Applications.

International Search Report and Written Opinion mailed Apr. 7, 2022, issued in International Application No. PCT/US2021/072897 (10 pages).

Huang, H et al., "On the improvement of reinforcement active learning with the involvement of cross entropy to address one-shot learning problem" PLoS One (2019) 14(6): e0217408. available at https://journals.plos.org/plosone/article?id=10.1371/journal.pone.0217408.

Yoo, D. et al., "Learning Loss for Active Learning", arXiv:1905.03677 [cs.CV], May 9, 2019. available at: https://openaccess.thecvf.com/content_CVPR_2019/papers/Yoo_Learning_Loss_for_Active_Learning_CVPR_2019_paper.pdf.

Aussel, N. et al., "Combining federated and active learning for communication-efficient distributed failure prediction in aeronautics" 2019, hal-02446200f, available at https://hal.archives-ouvertes.fr/hal-02446200/document.

Zhang et al, Edge-to-edge cooperative artificial intelligence in smart cities with on-demand learning offloading, 2019.

Claviere et al., Trajectory tracking control for robotic vehicles using counterexample guided training of neural networks, 2019.

Bobbili, N.P. et al., Jun. 2018, Adaptive weighting with smote for learning from imbalanced datasets: a case study for traffic offence prediction, 2018 IEEE International Conference on CIVEMSA, p. 1-6.

* cited by examiner

AUTONOMOUS VEHICLE SYSTEM FOR INTELLIGENT ON-BOARD SELECTION OF DATA FOR TRAINING A REMOTE MACHINE LEARNING MODEL

BACKGROUND

It is important to the operation of autonomous vehicles to be able to predict or forecast object behavior. Accurate forecasts of object behavior enables an autonomous vehicle to implement anticipatory planning and control rather than being reactive to its environment. This results in a more natural driving behavior by the autonomous vehicle as well as improved comfort and safety for its passengers.

Autonomous vehicles collect a large amount of data from numerous sensors in order to perform object detection and object behavior prediction. It is important to obtain real-world data regarding vehicle events that can be used to develop or train systems for vehicle control. However, real-world vehicle events of interest are sparse and difficult to isolate from continuously collected real-world data, because the total real-world datasets from driving sessions often contain redundancies and/or large quantities of irrelevant or less-relevant information as related to vehicle operations. Furthermore, the real-world data is typically collected at the "edge" of the computational network (e.g., in the vehicle during driving), where computing power and storage is limited (e.g., by physical constraints, thermal constraints, power constraints, etc.), and often substantially processed and/or stored in the cloud (e.g., at a remote computing system), which is associated with communication latency and bandwidth costs. It is desirable to meet accuracy requirements at the cloud computing, while balancing latency/cost requirements associated with computing edge. However, it is sometimes difficult for an autonomous vehicle to determine which images or information from which sources should be processed and used for machine learning models.

This document describes methods and systems that are directed to addressing the problems described above, and/or other issues.

SUMMARY

In various scenarios, systems and methods for selection of useful training data logs, on-board and autonomous vehicle, for training a machine learning model are disclosed. The system includes an autonomous vehicle that includes a plurality of sensors, a processor, and a non-transitory computer readable medium storing programming instructions. The processor is configured to execute the various methods. The methods include receiving a plurality of sensor data logs corresponding to surroundings of the autonomous vehicle from the sensors of the autonomous vehicle, and identifying one or more events within each sensor data log. The methods also include analyzing features of the identified one or more events within each sensor data log to determine whether that sensor data log satisfies one or more usefulness criteria for training a machine learning model, and transmitting that sensor data log to a remote computing device for training the machine learning model if that sensor data log satisfies one or more usefulness criteria for training the machine learning model. The features can include spatial features, temporal features, bounding box inconsistencies, or map-based features. Optionally, the autonomous vehicle may discard sensor data logs that do not satisfy the one or more usefulness criteria for training the machine learning model.

In various implementations, an event can include detection of an object within a sensor data log.

In various implementations, the methods may also include identifying one or more properties of the machine learning model. Optionally, the methods may include using the one or more properties for analyzing features of the identified one or more events within that sensor data log. Examples of such properties can include, without limitation, an actual accuracy of the machine learning model, a desired accuracy of the machine learning model, a false positive rate of the machine learning model, a false negative rate of the machine learning model, a convergence of the machine learning model, an output of the machine learning model, a statistical fit of the machine learning model, identification of a problem being solved using the machine learning model, and/or a training status of the machine learning model.

In certain implementations, the features include spatial features. In such implementations, the methods may analyze features of the identified one or more events within that sensor data log for determining whether that sensor data log satisfies the one or more usefulness criteria for training the machine learning model by comparing a first event identified using a first sensor data log collected by a first sensor of the plurality of sensors and a corresponding event identified using a second sensor data log collected by a second sensor of the plurality of sensors. The methods may then include analyzing whether a difference between the first event and the corresponding event is more than a threshold. Optionally, the methods may also include determining that the first sensor data log and the second sensor data log are spatially inconsistent when the difference between the first event and the corresponding event is more than the threshold, and determining that the first data log or the second data log satisfies the one or more usefulness criteria for training the machine learning model if an accuracy of the machine learning model will improve upon training using spatially inconsistent data logs. Additionally and/or alternatively, the methods may include determining that the first sensor data log and the second sensor data log are not spatially inconsistent if the difference between the first event and the corresponding event is less than the threshold, and determining that the first data log or the second data log does not satisfy the one or more usefulness criteria for training the machine learning model if the statistical fit of the machine learning model indicates overfitting.

In certain implementations, the features include temporal features. In such implementations, the methods may analyze features of the identified one or more events within that sensor data log for determining whether that sensor data log satisfies the one or more usefulness criteria for training the machine learning model by identifying an event using a first sensor data log collected by a first sensor of the plurality of sensors. The methods may then include determining whether the event can be identified using a second sensor data log collected by the first sensor immediately after collection of the first sensor log. Optionally, the methods may also include determining that the first sensor data log and the second sensor data log are temporally inconsistent if the event cannot be identified using the second sensor data log, and determining that the first data log or the second data log satisfies the one or more usefulness criteria for training the machine learning model if an accuracy of the machine learning model will improve upon training using temporally inconsistent data logs. Additionally and/or alternatively, the methods may include determining that the first sensor data log and the second sensor data log are not temporally inconsistent if the event can be identified using the second sensor data log, and determining that the first data log or the second data log does not satisfy the one or more usefulness criteria for training the machine learning model if the statistical fit of the machine learning model indicates overfitting.

In certain implementations, the features include bounding box inconsistencies. In such implementations, the methods may analyze features of the identified one or more events within that sensor data log for determining whether that sensor data log satisfies the one or more usefulness criteria for training the machine learning model comprises identifying an object within a bounding box using a first sensor data log collected by a first sensor of the plurality of sensors. The methods may then include tracking the object for predicting a bounding box for the object in a second sensor data log collected by the first sensor immediately after collection of the first sensor log, and determining whether the object can be identified within the predicted bounding box using the second sensor data log. Optionally, the methods may also include determining that the first sensor data log and the second sensor data log include bounding box inconsistencies if the object cannot be identified within the predicted bounding box using the second sensor data log, and determining that the first data log or the second data log satisfies the one or more usefulness criteria for training the machine learning model if an accuracy of the machine learning model will improve upon training using bounding box inconsistent data logs. Additionally and/or alternatively, the methods may include determining that the first sensor data log and the second sensor data log do not include bounding box inconsistencies if the object can be identified within the predicted bounding box using the second sensor data log, and determining that the first data log or the second data log does not satisfy the one or more usefulness criteria for training the machine learning model if the statistical fit of the machine learning model indicates overfitting.

In certain implementations, the features include map-based features. In such implementations, the methods may analyze features of the identified one or more events within that sensor data log for determining whether that sensor data log satisfies one or more usefulness criteria for training the machine learning model comprises determining that an event identified using that sensor data log violates the map-based features. The methods may then include determining that the sensor log satisfies the one or more usefulness criteria when it violates the map-based features.

In various implementations, the methods may also include receiving information relating to an effectiveness of that sensor data log for training the machine learning model from the remote server, and updating (using the received information) the analyzing of features of the identified one or more events within a subsequently received sensor data log for determining whether the subsequently received sensor data log satisfies the one or more usefulness criteria for training the machine learning model.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

A variety of algorithms for control and navigation of autonomous vehicles, such as object detection algorithms for detecting objects in images, use machine learning models that are trained using labeled training data. While such training such models require a large amount of training data (i.e., labeled images), it is not feasible to use all or majority of data collected by an autonomous vehicle because of memory and transmission constraints. Typically, a passive learning method accepts randomly selected training data. However, such random selection of training data requires expensive labeling which might not improve the training of the machine learning model (e.g., when the randomly selected training data does not include useful information). In active learning, "useful" data (e.g., wrongly predicted label, uncertain prediction label, etc.) is selected for subsequent training of a machine learning model, instead of passively accepting randomly selected data. Active learning can significantly reduce the amount of training data required, compared to passive learning while achieving similar classification accuracy as passive learning.

Aspects of the current disclosure improve training of machine learning models by intelligently selecting raw data samples at the computing edge (i.e., the vehicle collecting sensor data) for subsequent storage, annotation and/or use in training at a remote server.

Figure 1:
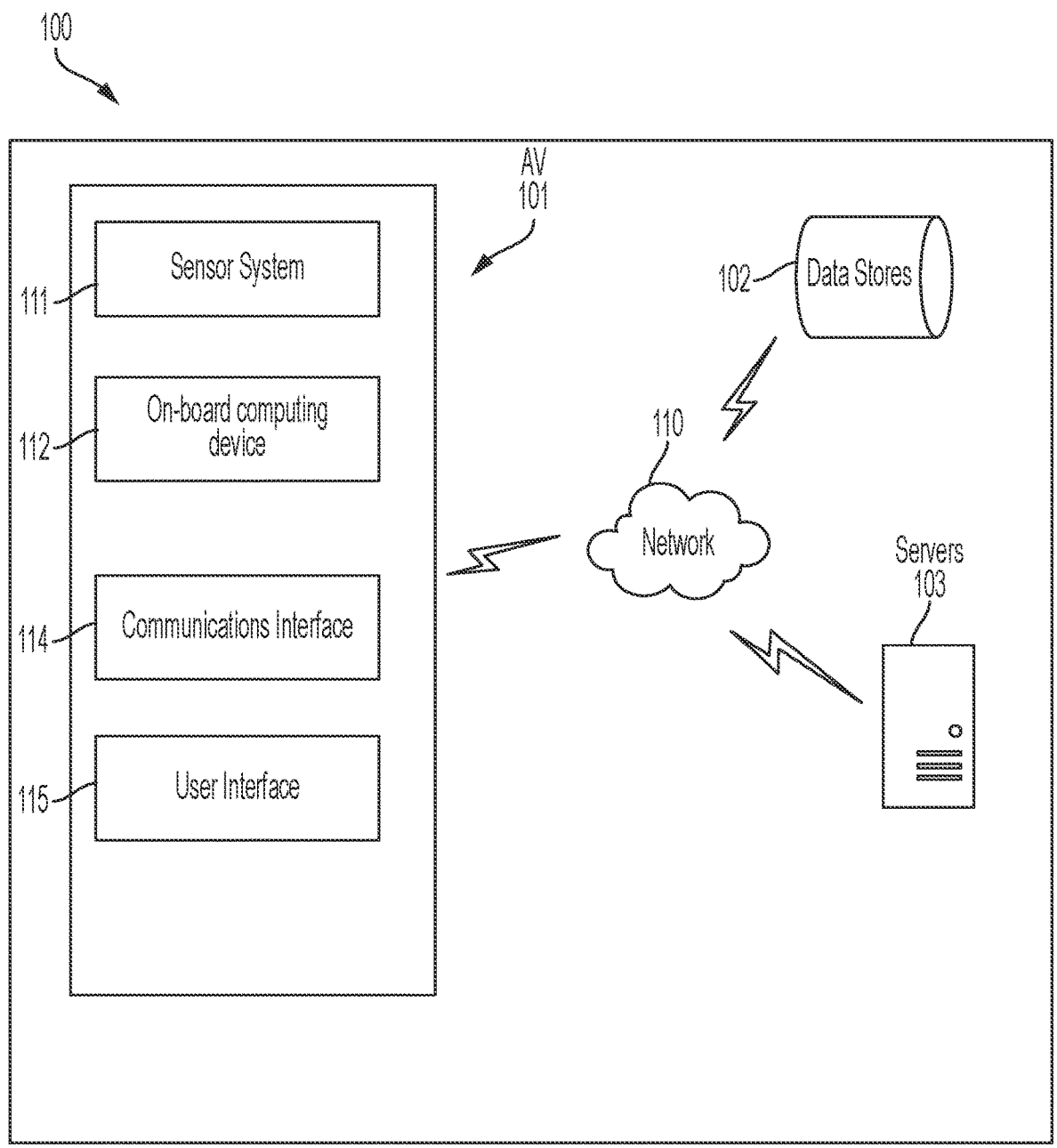
FIG. 1 is a block diagram illustrating an example autonomous vehicle system.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be communicatively coupled to each other and/or communicatively coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), historical information data store(s), traffic information data store(s), user information data store(s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, an on-board computing device 112, a communications interface 114, and a user interface 115. Autonomous vehicle 101 may further include certain components (as illustrated, for example, in FIG. 2) included in vehicles, such as, an engine, wheels, steering wheel, transmission, etc., which may be controlled by the on-board computing device 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101 and that are configured for sensing or measuring properties of the autonomous vehicle's environment. Examples of such sensors include, without limitation, a LIDAR system, a radio detection and ranging (RADAR) system, a laser detection and ranging system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

The LIDAR system may include a sensor configured to sense or detect objects in an environment in which the autonomous vehicle 101 is located using light. Generally, a LIDAR system is a device that incorporates optical remote sensing technology that can measure distance to, or other properties of, a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam, and scan the beam to generate two dimensional or three dimensional range matrices. In examples, the LIDAR system may include components such as light (e.g., laser) source, scanner and optics, photo-detector and receiver electronics, and position and navigation system. In an example, The LIDAR system may be configured to use ultraviolet (UV), visible, or infrared light to image objects and can be used with a wide range of targets, including non-metallic objects. In one example, a narrow laser beam can be used to map physical features of an object with high resolution.

Figure 2:
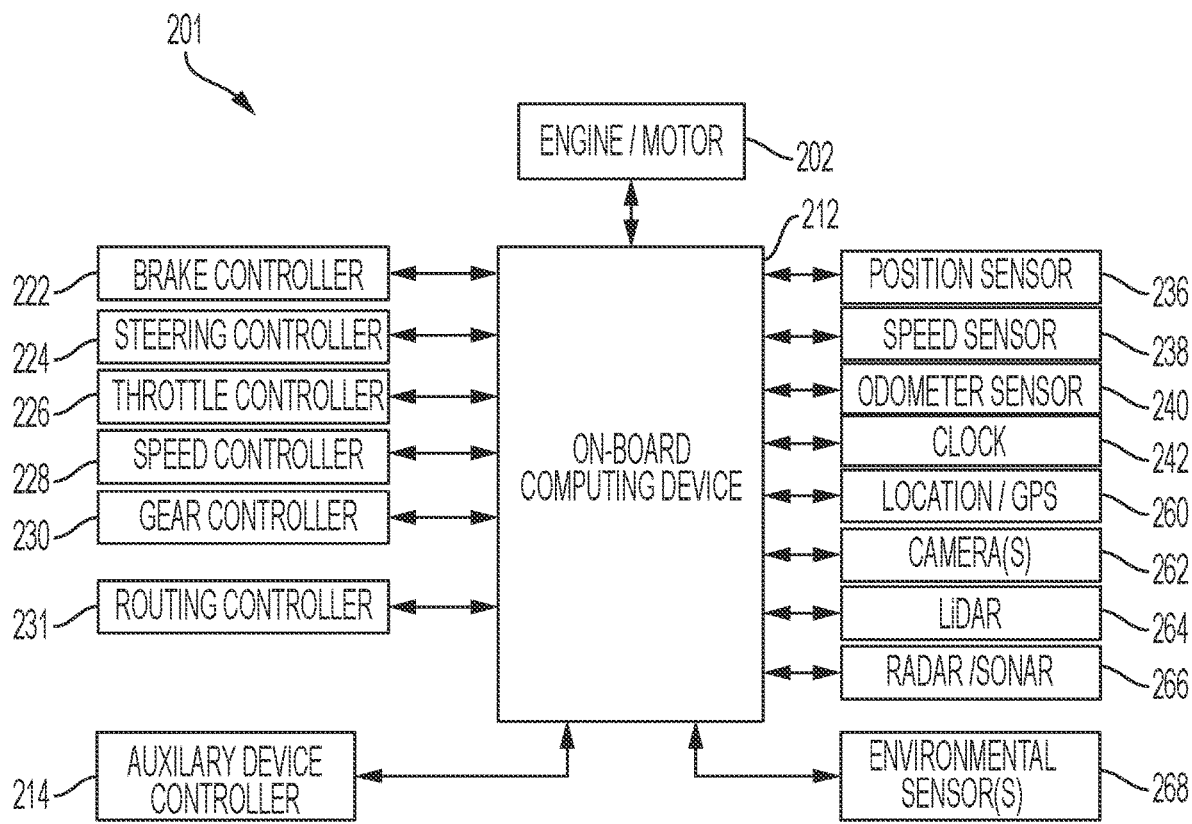
FIG. 2 illustrates an example vehicle controller system.

FIG. 2 illustrates an example system architecture for a vehicle 201, such as the autonomous vehicle 101 of FIG. 1 autonomous vehicle. The vehicle 201 may include an engine or motor 202 and various sensors for measuring various parameters of the vehicle and/or its environment. Operational parameter sensors that are common to both types of vehicles include, for example: a position sensor 236 such as an accelerometer, gyroscope and/or inertial measurement unit; a speed sensor 238; and an odometer sensor 240. The vehicle 201 also may have a clock 242 that the system architecture uses to determine vehicle time during operation. The clock 242 may be encoded into the vehicle on-board computing device 212, it may be a separate device, or multiple clocks may be available.

The vehicle 201 also may include various sensors that operate to gather information about the environment in which the vehicle is traveling. These sensors may include, for example: a location sensor 260 such as a GPS device; object detection sensors such as one or more cameras 262; a LiDAR sensor system 264; and/or a radar and or and/or a sonar system 266. The sensors also may include environmental sensors 268 such as a precipitation sensor and/or ambient temperature sensor. The object detection sensors may enable the vehicle 201 to detect objects that are within a given distance or range of the vehicle 201 in any direction, while the environmental sensors collect data about environmental conditions within the vehicle's area of travel. The system architecture will also include one or more cameras 262 for capturing images of the environment.

During operations, information is communicated from the sensors to an on-board computing device 212. The on-board computing device 212 analyzes the data captured by the sensors and optionally controls operations of the vehicle based on results of the analysis. For example, the on-board computing device 212 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers such as an auxiliary device controller 214.

Geographic location information may be communicated from the location sensor 220 to the on-board computing device 212, which may then access a map of the environment that corresponds to the location information to determine known fixed features of the environment such as streets, buildings, stop signs and/or stop/go signals. Captured images from the cameras 262 and/or object detection information captured from sensors such as a LiDAR system 264 is communicated from those sensors to the on-board computing device 212. The object detection information and/or captured images may be processed by the on-board computing device 212 to detect objects in proximity to the vehicle 201. In addition or alternatively, the vehicle 201 may transmit any of the data to a remote server system 103 (FIG. 1) for processing. Any known or to be known technique for making an object detection based on sensor data and/or captured images can be used in the embodiments disclosed in this document.

The on-board computing device 212 may obtain, retrieve, and/or create map data that provides detailed information about the surrounding environment of the autonomous vehicle 201. The on-board computing device 212 may also determine the location, orientation, pose, etc. of the AV in the environment (localization) based on, for example, three dimensional position data (e.g., data from a GPS), three dimensional orientation data, predicted locations, or the like. For example, the on-board computing device 212 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 212 in analyzing the surrounding environment of the autonomous vehicle 201. The map data may also include information and/or rules for determining right of way of objects and/or vehicles in conflicted areas or spaces.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 212 may also include and/or may receive information relating to the trip or route of a user, real-time traffic information on the route, or the like.

The on-board computing device 212 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various implementations, an on-board computing device 212 may determine perception information of the surrounding environment of the autonomous vehicle 201. Based on the sensor data provided by one or more sensors and location information that is obtained, the on-board computing device 212 may determine perception information of the surrounding environment of the autonomous vehicle 201. The perception information may represent what an ordinary driver would perceive in the surrounding environment of a vehicle. The perception data may include information relating to one or more objects in the environment of the autonomous vehicle 201. For example, the on-board computing device 212 may process sensor data (e.g., LIDAR or RADAR data, camera images, etc.) in order to identify objects and/or features in the environment of autonomous vehicle 201. The objects may include traffic signals, road way boundaries, other vehicles, pedestrians, and/or obstacles, etc. The on-board computing device 212 may use any now or hereafter known object recognition or detection algorithms, video tracking algorithms, and computer vision algorithms (e.g., track objects frame-to-frame iteratively over a number of time periods) to determine the perception. In an embodiment, the on-board computing device 212 may include an object detector that detects and labels objects. An example object detector is a convolutional neural network (CNN). The object detector may output an image or point cloud that includes bounding boxes surrounding the detected objects, labels for the objects and/or bounding box scores that indicate a degree of confidence that the objects detected were correctly labeled.

In some embodiments, the on-board computing device 212 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information. As discussed below in more detail, the on-board computing device 212 may also identify a lane being occupied by an object at any given time.

The on-board computing device 212 may perform one or more prediction and/or forecasting operations. For example, the on-board computing device 212 may predict future locations, trajectories, and/or actions of one or more objects. For example, the on-board computing device 212 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 201, the surrounding environment, and/or their relationship(s). For example, if an object is a vehicle and the current driving environment includes an intersection, the on-board computing device 212 may predict whether the object will likely move straight forward or make a turn. If the perception data indicates that the intersection has no traffic light, the on-board computing device 212 may also predict whether the vehicle may have to fully stop prior to enter the intersection.

The prediction and/or forecasting operations of the on-board computing device 212 can also be used to reduce the number of data samples (e.g., images) that require de novo object recognition to be performed, by tracking previously detected and/or classified objects between frames in a sequence of image frames. In some examples, object tracking can be performed via point tracking, such as by deterministic methods (e.g., with parametric constraints based on the object class of an object) or statistical methods (e.g., Kalman filtering). In some other examples, object tracking can be performed via kernel filtering and kernel tracking, such as using template-based methods or multi-view appearance methods. Optionally, object tracking can be performed via silhouette tracking, such as using shape matching, edge matching, and/or contour tracking. However, object tracking and trajectory prediction and/or determination can be determined using motion analysis or otherwise suitably performed via any suitable method or technique.

In various embodiments, the on-board computing device 212 may determine a motion plan for the autonomous vehicle. For example, the on-board computing device 212 may determine a motion plan for the autonomous vehicle based on the perception data and/or the prediction data. Specifically, given predictions about the future locations of proximate objects and other perception data, the on-board computing device 212 can determine a motion plan for the autonomous vehicle 201 that best navigates the autonomous vehicle relative to the objects at their future locations.

In one or more embodiments, the on-board computing device 212 may receive predictions and make a decision regarding how to handle objects in the environment of the autonomous vehicle 201. For example, for a particular object (e.g., a vehicle with a given speed, direction, turning angle, etc.), the on-board computing device 212 decides whether to overtake, yield, stop, and/or pass based on, for example, traffic conditions, map data, state of the autonomous vehicle, etc. Furthermore, the on-board computing device 212 also plans a path for the autonomous vehicle 201 to travel on a given route, as well as driving parameters (e.g., distance, speed, and/or turning angle). That is, for a given object, the on-board computing device 212 decides what to do with the object and determines how to do it. For example, for a given object, the on-board computing device 212 may decide to pass the object and may determine whether to pass on the left side or right side of the object (including motion parameters such as speed). The on-board computing device 212 may also assess the risk of a collision between a detected object and the autonomous vehicle 201. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 212 may execute one or more control instructions to perform a cautious maneuver (e.g., mildly slow down, accelerate, change lane, or swerve). In contrast, if the collision cannot be avoided, then the on-board computing device 212 may execute one or more control instructions for execution of an emergency maneuver (e.g., brake and/or change direction of travel).

For example, if the on-board computing device 212 determines that based on the object trajectory forecasts, an object is likely to break a right of way agreement with the autonomous vehicle, the on-board computing device 212 may determine a motion plan for the autonomous vehicle that avoids collision with such an object in a conflicted space.

As discussed above, planning and control data regarding the movement of the autonomous vehicle is generated for execution. The on-board computing device 212 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyword, a touch screen display device, a microphone, and a speaker, etc.

Figure 3:
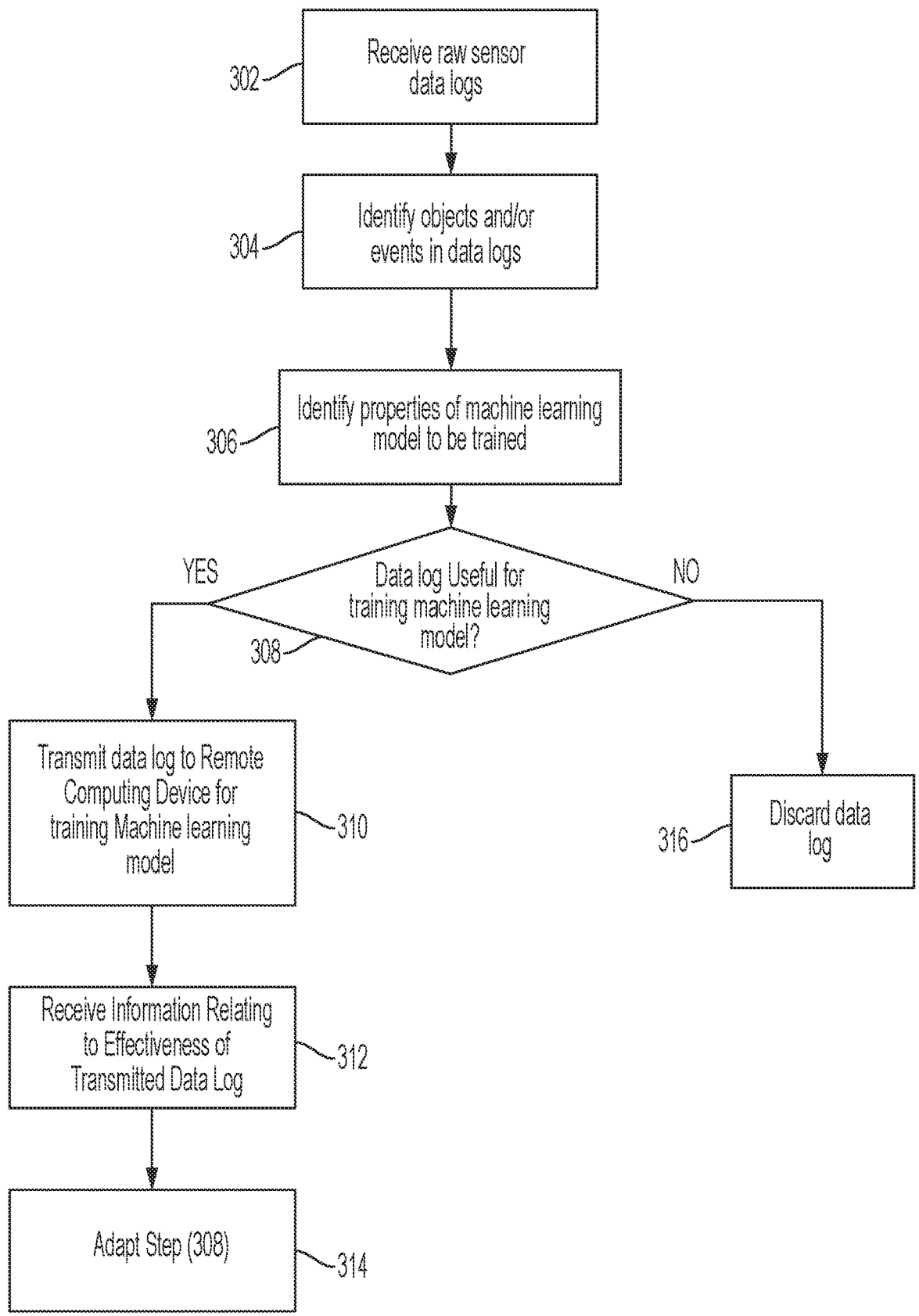
FIG. 3 illustrates a flow chart of an example method for intelligent on-board selection of data for training a remote machine learning model according to an embodiment.

Referring now to FIG. 3, a flowchart illustrating an example method for on-board selection of relevant data for subsequent transmission to a remote server and use in training of a machine learning model. The method can be performed in real or near-real time (e.g., as the image data is recorded), after a delay, or at any suitable time. The method can be performed a predetermined number of times for a driving session, iteratively performed at a predetermined frequency for a driving session, or performed at any suitable time. Multiple instances of the method can be concurrently performed for multiple concurrent driving sessions (e.g., for different vehicles, via different vehicle systems). However, any suitable number of method instances can be performed at any suitable time.

At 302, the on-board computing device of an autonomous vehicle may receive raw data logs from one or more sensors. The data logs are gathered (e.g., recorded, obtained, etc.) at a vehicle system mounted to a vehicle during operation (e.g., driving). Examples of such raw data logs may include, without limitations, point clouds, 2D images, 3D images, audio logs, or the like. Data logs can include single data points (e.g., single images, single point cloud frames), data sequences (e.g., an image sequence, a video, bursts of point cloud frames, etc.), and/or any other suitable data sample. A single "log" of sensor data refers to data collected by a sensor over a contiguous time period "t". The data logs can include sensor measurement data in frames or scans over time, such as periodically, intermittently, in response to sensing events, or the like. Data logs data can be recorded constantly (e.g., continuously), periodically, randomly, upon occurrence of a trigger event (e.g., a driving event, a data value or signal exceeding a threshold value, etc.), and/or with any other suitable temporal characteristics.

Optionally, a data log may also include information (e.g., perception information, detection information, or the like) generated by the on-board computing device by using that data log as an input to a machine learning model. Such information may be used by the system for analyzing the effectiveness of various data log selection strategies for training of that machine learning model (discussed below). For example, a data log may include detection bounding boxes, tracker polygons or prediction trajectories generated by the on-board computing device.

Figure 4:
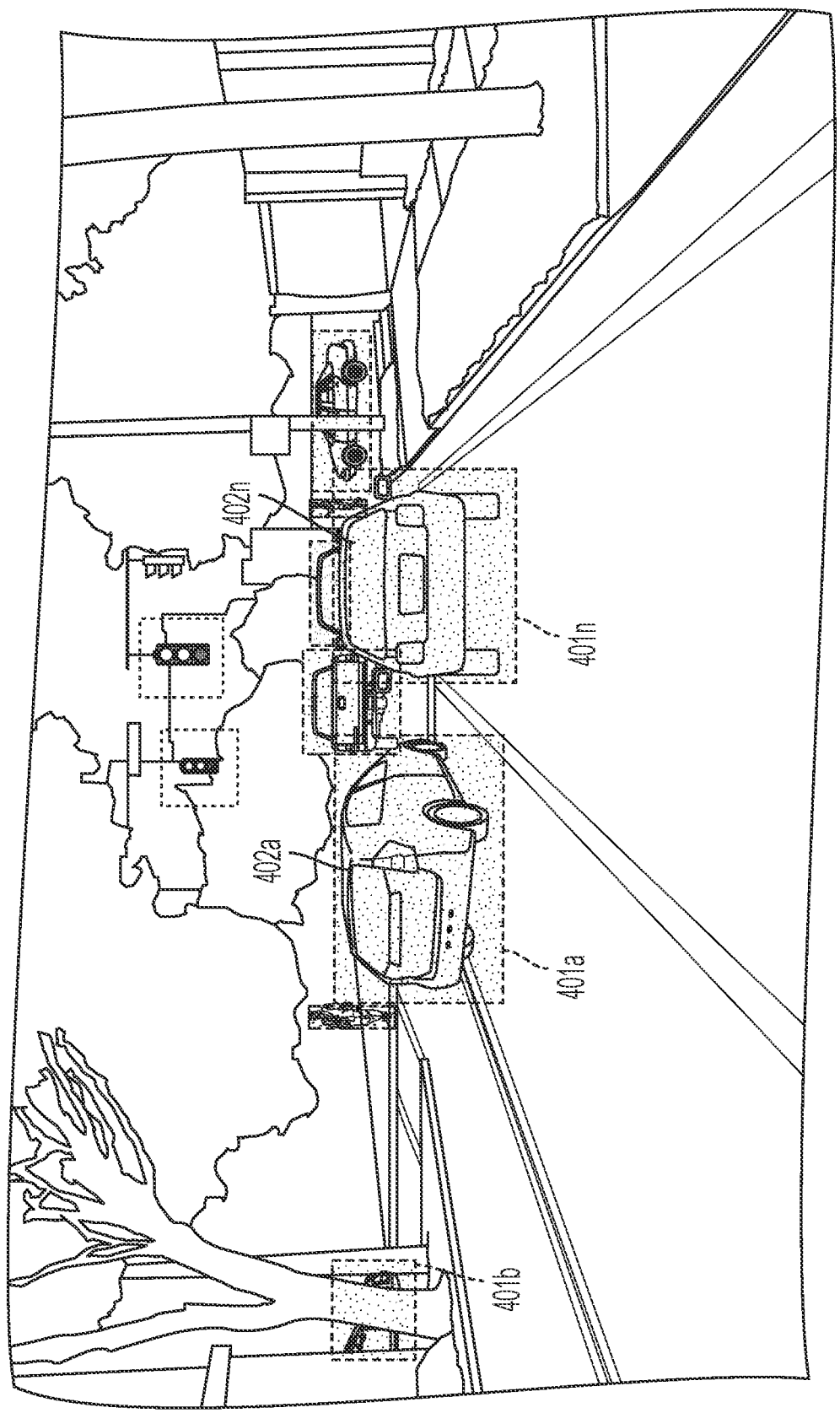
FIG. 4 illustrates an example image data log including detected bounding box(es) and masks.

At 304, the on-board computing device may identify, label and/or track one or more objects and/or events in each received raw data log (e.g., point cloud, camera image, etc.). For example, an example object detection model (e.g., a convolutional neural network (CNN), a mask R-CNN, etc.) may be used to detect and label one or more objects and/or events in each received raw data log. The object detection model may output an image or point cloud that includes bounding boxes surrounding the detected objects, masks over the detected objects, and/or labels for the objects. A bounding box indicates a region of the unlabeled data log that is believed to contain an identified object. Thus, the bounding box may be assigned a label indicating the identified object that is believed to be contained within the bounding box. Each detected object may be represented by its location (centroid or center point), boundary, label class, or even size. In an embodiment, the object detector can output an image or point cloud that includes bounding boxes surrounding the detected objects and/or labels for the detected objects. The detected and/or tracked objects may be time stamped. An image 400 including bounding boxes 401*a-n* and masks 402*a-n* are shown in FIG. 4.

The on-board computing device may then identify (306) one or more properties of the machine learning model(s) which will be trained using the data log. Examples of such properties may include, for example, the actual and/or desired accuracy, false positive rate, false negative rate, convergence, statistical fit, output of the machine learning model, problem being solved using the machine learning model, training status of the machine learning model, or the like. A machine learning model is trained by adjusting its operating parameters until a desirable training output is achieved. The determination of whether a training output is desirable may be accomplished either manually or automatically by comparing the training output to the known characteristics of the training data. A learning machine is considered to be trained when its training output is within a predetermined error threshold from the known characteristics of the training data.

The on-board computing device may receive the information from, for example, a remote server that trains the machine learning model(s). Alternatively and/or additionally, may identify the properties based on, for example, the current output of the currently executing machine learning models, the required output for solving various problems using the machine learning model(s), or the like. Examples of machine learning models may include, without limitation, tracking models, shape estimation models, object detection models, pose estimation models, classification and labeling models, segmentation models, motion planning models, forecasting models, prediction models, or the like Optionally, the on-board computing device may also receive and/or identify distribution and/or characteristics of data within existing training data sets used to train the machine learning model. For example, the on-board computing device may identify features and/or instances in the data log which are missing or are not adequately represented in the training data (e.g., some types of objects such as garbage trucks, construction related objects, etc. may be missing and/or inadequately represented in a training data set for training an object detection model; data logs associated with events such as vehicles not stopping at a red light may be missing and/or inadequately represented in a training data set for training a motion planning model). In another example, certain types of features and/or instances may be over represented in the existing training data.

The on-board computing device may then process each data log to determine whether it will be useful for training a machine learning model (308) by analyzing one or more features relating to the objects or events identified in the data log. Examples of such feature may include, without limitation, spatial features, temporal features, map based features, bounding box inconsistencies, detection and/or labeling accuracy, qualitative properties of the data log, type(s) of object(s) and/or event(s) detected within the data log, or the like (described in more detail below with respect to an object detection mode). A data log is "useful" if it satisfies one or more usefulness criteria such as, for example, the data log can be used for initially training a machine learning model, the data log can reduce training time, the data log can improve the accuracy of a machine learning model, the data log can reduce overfitting (i.e., the log data has reduced redundancy), or the like. A data log may be useful as a negative data log (i.e., inconsistent prediction). For example, events or objects detected within a data log that indicate incorrect detection results may be labeled as such so that they can be used to adjust the models for better future performance (i.e., learning in which a model learns from mistakes). Data logs that indicate correct detection results may also need to be labeled as such so that they can be used as positive data logs to reinforce the model output instead of learning from mistakes.

The features analyzed for determining the usefulness of a data log may be associated with the type and properties of the machine learning model that will be trained (or updated using the data log) as well as the characteristics of the current training dataset. For example, an object detection model that has low detection accuracy for one or more types of objects may be updated by training using data logs that include true positive detections for that object (and/or false positives) and/or data logs that include incorrect detections labeled with the correct information; and the on-board computing device may identify any such data logs as useful. Similarly, a previously overfitted machine learning model may be trained using data logs that were underrepresented and/or absent from the existing training data (i.e., useful data log), and redundant (i.e., overrepresented) data logs may be identified as not being useful. Examples of such features may include, without limitation, spatial features, temporal features, bounding box features, map based features, or the like.

Spatial features of data logs may be used to identify inconsistencies between object detection based on data from multiple sensor modalities (i.e., different types of sensors). Regions of interest detected from data in some modality (e.g., video images from cameras) may be cross checked using data from a different modality (e.g., range data from, e.g., LIDAR or RADAR sensor) for identifying data logs that include spatial inconsistencies. For example, depth information, shape information, and/or size information may be assessed across modalities for consistency. Examples include inconsistencies between objects and/or events detected from data acquired by passive sensors (e.g., video cameras) at a specific moment and objects and/or events detected from data acquired by active sensors (e.g., LiDAR sensors) at the same moment. For example, an object and its estimated depth detected from video data at moment A may be compared with active sensor data which provide depth information acquired at moment A by, for example, a LIDAR sensor to identify inconsistencies in data logs acquired either by the camera and/or the LIDAR (at moment A). For instance, if a detected object is estimated to have an estimated size and depth based on data collected by a camera, if the data from a LiDAR sensor approximately confirm the size and depth of the object, there is no inconsistency in the data log in the spatial domain, and the object may likely be considered to be correctly detected. However, if there is a dissimilarity in depth and/or size of the object (from different modalities) that is higher than a threshold, the data log may be labeled as an inaccurate, false positive and/or false negative detection. Such inconsistent data logs (i.e., negative data logs) that may lead to inaccuracies, false positives and/or false negatives may be considered "useful" for training and/or updating a machine learning model along with the correct label or information (e.g., size, depth, type, etc.). Alternatively and/or additionally, data logs that are spatially consistent (i.e., positive data logs) may be considered useful data for learning to reinforce the output of the detection model. Both positive (spatially consistent with the identified accurate label) and negative (spatially inconsistent with the corrected label and/or the identified label) data logs can be useful for training machine learning models because, for example, an optimal balance between the positive and negative data logs can be key for improving model performance. In some examples, if a data log has a label is overrepresented in the existing training dataset, such data logs may be deemed redundant and not useful. Conversely, if a data log has a label that is under-represented in the existing training dataset (whether spatially consistent or inconsistent), such data logs may be deemed useful.

In various implementations, temporal features may be used to determine if successive frames of data logs (e.g., successive video frames) acquired from the same sensor modality contain temporal noise or inconsistencies. Object tracking algorithms (e.g., contour tracking, kernel-based tracking, CNN-based approaches) can be used to track the objects across frames to detect such temporal inconsistencies or noise.

Such temporal features may reveal that the outcome of current detection is inconsistent with earlier detection results. For example, a detected object may disappear and then reappear in successive data logs (e.g., video frames, point clouds), and such data logs may be identified as being inconsistent across the temporal domain. Similarly, two successive data logs where a parked vehicle is detected in the first acquired data log and not in the subsequently data log may be identified as being inconsistent. In another example, two successive data logs where the pose of a detected vehicle in the first acquired data log is substantially different (that more than a threshold degree) from the pose in the subsequently data log may be identified as being inconsistent. This could be caused by different reasons. No earlier detected corresponding object may be due to that the same object was not previously detected or was not previously detected with a high enough confidence (but now the object is detected with enough confidence). This may occur when the object is previously small, occluded, or not detected reliably due to weather conditions (raining, snowing, or sun glare, etc.) but now due to motion, the object appears larger in view, closer in distance, more visible, or at a better location by which it can be more reliably detected (e.g., occlusion is gone). This scenario may also indicate a present false positive situation. Alternatively, there are one or more earlier detected objects but there is no corresponding object detected presently. This scenario may occur when the object is previously close and hence large or detected reliably due to conditions (no occlusion, no raining, no snowing, no sun glare, etc.) but now the object is farther away due to motion and hence is smaller and less visible (possibly even disappeared, e.g., a car in front turned a corner so that it is no longer visible), occluded, or due to other external conditions so that the object is presently cannot be detected reliably. This scenario may also indicate a present false negative situation. The data log(s) that contain temporal inconsistencies may be considered useful for training and/or updating a machine learning model with the appropriate labels (i.e., false positive, false negative, and/or inaccurate). Alternatively and/or additionally, data logs that are temporally consistent may be considered useful positive data log. Specifically, both positive (temporally consistent with the identified accurate label) and negative (temporally inconsistent with the corrected label and/or the identified label) data logs can be useful for training machine learning models because, for example, an optimal balance between the positive and negative data logs can be key for improving model performance. In some examples, if a data log has a label is overrepresented in the existing training dataset, such data logs may be deemed redundant and not useful. Conversely, if a data log has a label that is under-represented in the existing training dataset (whether temporally consistent or inconsistent), such data logs may be deemed useful.

Similar to the temporal features, bounding box inconsistencies in a data log may be used to identify whether or not the data log is useful. For example, for sequential data logs including, the on-board computing system may define a tracked bounding box about a detected object (detected in the first data log) based upon a predicted trajectory (as determined by a tracking model) of the detected object between the first and second data log. Depending on whether or not the object is detected within the bounding box in the second data log by the detection model, the bounding box inconsistency can be used to train and/or update the detection model and/or the tracking model (by, for example, labeling the bounding box as false positive, true positive, false negative, or true negative). For example, the tracking model may have incorrectly predicted the trajectory of the detected object, and the data log may be useful as a negative data log when the bounding box is a true negative detection. Alternatively, the detection model may have missed the detection, and the data log may be useful negative data log of the detection model when the bounding box is a false negative detection. In another scenario, the tracking model and the detection may both be accurate and the data log may be used as a positive data log to improve accuracy of detection (true positive detection).

In some implementations, map based features may be used to determine if detected objects are violating map constraints. For example, a car that is detected inside a building violates a map constraint, and the data log(s) in which the car is detected may not be considered useful for training and/or updating a machine learning model. The map constraints may be hard constraints and/or statistically modeled. Data logs that violate map constraints may be useful as negative data logs, whereas data logs that do not violate map constraints may be useful as positive data logs.

At 310, the on-board computing device may transmit the data log to a remote computing device for updating and/or training a machine learning model if it is identified as being useful (308: YES), and discard (316) the data logs that are not identified as useful (308: NO). Since there is too much sensor data to store in a practical on-board computing system of an autonomous vehicle, the active learning system disclosed herein helps reduce the amount of data logs stored in the database, and to find a balance between quantity and quality of data logs in the database to optimize system performance and cost. Moreover, the effects of different kinds of errors (e.g., missing objects, inaccurate position) on performance can be analyzed, as well as training the same model with different amounts of data.

At 312, the on-board computing device may receive information relating to the effectiveness of the selected useful data (transmitted in 310) in improving the machine learning model trained using the transmitted data, and adapt step 308 of determining whether or not a data log is useful (i.e., data selection) accordingly (314). Specifically, the on-board computing device may modify determination of whether or not a data log is useful for training a machine learning model based on the received effectiveness information. For example, in certain examples, the received effectiveness information may indicate that a data log selection strategy (i.e., determining usefulness of data) based on temporal features yields data logs that improve the performance of a machine learning model more when compared to data logs selected based on map features. In such examples, the on-board computing device may give more weight to data selection strategies based on temporal features instead of map features (for example, when there is a conflict between the results of the data selection based on temporal features and data selection based on map features). The on-board computing device may similarly assign (and/or periodically update) the weights associated with various data log selection strategies discussed above. Similarly, the received effectiveness information may indicate that a data log selection strategy (i.e., determining usefulness of data) based on spatial feature yields data logs that improve the performance of a machine learning model more when compared to data selected using a random data selection strategy. The on-board computing device may, therefore, reduce the frequency of using the random data selection strategy and increase the frequency of using the data log selection strategy based on spatial features. The on-board computing device may similarly assign (and/or periodically update) the frequency associated with various data log selection strategies discussed above.

The on-board computing may receive the information relating to the effectiveness of the selected useful data from, for example, the remote server. The remote server may determine the effectiveness based on, for example, an analysis of a change in performance of the machine learning model (e.g., accuracy, processing cost, etc.), change in an optimization function of the machine learning model (e.g., a loss function that includes penalties that increase with increasing deviation from a target output of the machine learning model), changes in parameters of the machine learning model, or the like.

To further enhance the performance at a global level, the present teaching discloses that an in situ computer aided perception system on each autonomous vehicle in a large fleet may automatically select appropriate labeled training data and transmit to a remote machine learning model training/update server. In this manner, hundreds of thousands sets of labeled training data (generated while the vehicles are in operation) from diverse types of environment are consolidated at the remote machine learning model training/update server so that machine learning models can be updated based on a wide range of labeled training data from sources (and may be deployed back to the autonomous vehicles in the fleet). As such fleet data present meaningful data related to a wide variety of perception conditions and situations, the global models can be trained and re-trained on a continuous basis to handle intended tasks in different conditions.

While the above description relates to selection of raw or unlabeled images for subsequent labeling and for training a machine learning model that performs object detection, the disclosure is not so limiting. In particular, the methods and systems of this disclosure can be used for selection of any kind of raw data for training of many different kinds of models such as, without limitation, tracking models, motion planning models, forecasting models, prediction models, or the like. For example, the system may compare trajectories predicted by a prediction model and real-time trajectories in the near future to generate consistent and inconsistent data logs (as discussed above) for the prediction model, and choose the useful data logs for training/updating the prediction model.

Figure 5:
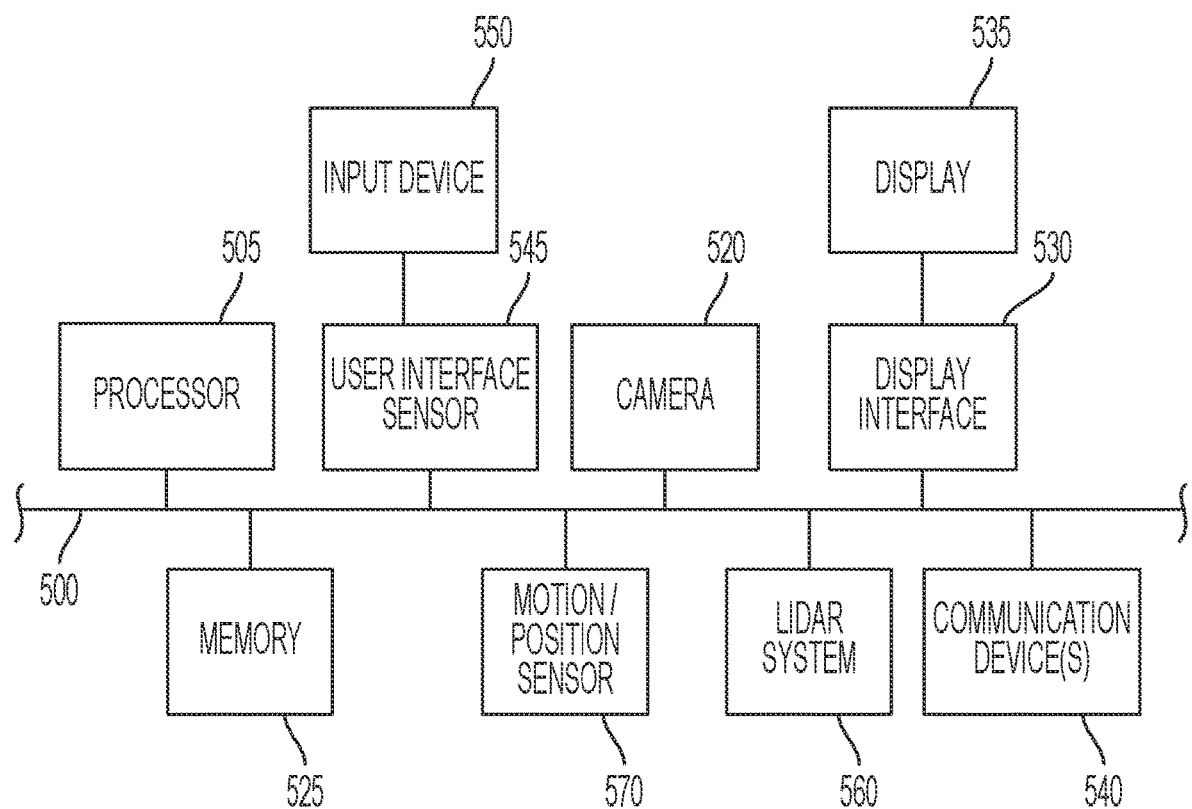
FIG. 5 is a block diagram that illustrates various elements of a possible electronic system, subsystem, controller and/or other component of an AV, and/or external electronic device.

FIG. 5 depicts an example of internal hardware that may be included in any of the electronic components of the system, such as internal processing systems of the AV, external monitoring and reporting systems, or remote servers. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored. Various embodiments of the invention may include a computer-readable medium containing programming instructions that are configured to cause one or more processors, and/or devices to perform the functions described in the context of the previous figures.

An optional display interface 530 may permit information from the bus 500 to be displayed on a display device 535 in visual, graphic or alphanumeric format, such on an in-dashboard display system of the vehicle. An audio interface and audio output (such as a speaker) also may be provided. Communication with external devices may occur using various communication devices 540 such as a wireless antenna, a radio frequency identification (RFID) tag and/or short-range or near-field communication transceiver, each of which may optionally communicatively connect with other components of the device via one or more communication system. The communication device(s) 540 may be configured to be communicatively connected to a communications network, such as the Internet, a local area network or a cellular telephone data network.

The hardware may also include a user interface sensor 545 that allows for receipt of data from input devices 550 such as a keyboard or keypad, a joystick, a touchscreen, a touch pad, a remote control, a pointing device and/or microphone. Digital image frames also may be received from a camera 520 that can capture video and/or still images. The system also may receive data from a motion and/or position sensor 570 such as an accelerometer, gyroscope or inertial measurement unit. The system also may receive data from a LiDAR system 560 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

The term "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service.

The term "bounding box" refers to a rectangular box that represents the location of an object. A bounding box may be represented in data by x- and y-axis coordinates $[x_{max}, y_{max}]$ that correspond to a first corner of the box (such as the upper right corner), along with x- and y-axis coordinates $[x_{min}, y_{min}]$ that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera, or points of a point cloud captured by a LiDAR sensor.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" or "communicatively coupled" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method for on-board selection of data logs for training a machine learning model, comprising, by an on-board computing device of an autonomous vehicle:
 receiving, from a plurality of sensors, a plurality of sensor data logs corresponding to surroundings of the autonomous vehicle;
 identifying one or more events within each of the plurality of sensor data logs;
 identifying a property of a plurality of different properties of the machine learning model that is to be trained;
 identifying a first event of the one or more events which is missing or under-represented in training data for training the identified property of the machine learning model;
 for each sensor data log of the plurality of sensor data logs associated with the identified first event:
  analyzing features of the identified one or more events within that sensor data log for determining whether that sensor data log satisfies one or more usefulness criteria for training the identified property of the machine learning model by comparing a first event identified using a first sensor data log collected by a first sensor of the plurality of sensors and a corresponding event identified using a second sensor data log collected by a second sensor of the plurality of sensors, wherein the features comprise at least spatial features,
  analyzing whether a difference between the first event and the corresponding event is more than a threshold,
  determining that the first sensor data log and the second sensor data log are spatially inconsistent if the difference between the first event and the corresponding event is more than the threshold,
  determining that the first sensor data log or the second sensor data log satisfies the one or more usefulness criteria for training the identified property of the machine learning model if an actual accuracy of the machine learning model will improve upon training using spatially inconsistent first sensor data log and second sensor data log, and
  in response to determining that that sensor data log satisfies one or more usefulness criteria for training the machine learning model, transmitting that sensor data log to a remote computing device for training the machine learning model;
 performing operations by a control system to control, using the machine learning model trained using the transmitted sensor data log, movement of the autonomous vehicle along a navigation route;
 receiving information relating to an effectiveness of the sensor data log in training the machine learning model; and
 modifying, based on the received information, a weight or frequency of use associated with at least one data log selection strategy of a plurality of different data log selection strategies that can be used during said analyzing features.

2. The method of claim 1, further comprising, in response to determining that that sensor data log does not satisfy the one or more usefulness criteria for training the identified property of the machine learning model, discarding that sensor data log.

3. The method of claim 1, wherein identifying the one or more events within each of the plurality of sensor data logs comprises detection of an object within a sensor data log.

4. The method of claim 1, wherein the identified property comprises at least one of the following: a desired accuracy of the machine learning model, a convergence of the machine learning model, a statistical fit of the machine learning model, identification of a problem being solved using the machine learning model, or a training status of the machine learning model.

5. The method of claim 1, wherein the analyzing comprises
 checking a consistency of ones of the features related to the identified events within ones of the plurality of sensor data logs that were acquired using at least two sensors of a same sensor modality or different sensor modalities;
 assigning a label of a plurality of different labels to the sensor data log based on the consistency; and
 basing said determining at least on the label.

6. A method for on-board selection of data logs for training a machine learning model, comprising, by an on-board computing device of an autonomous vehicle:
 receiving, from a plurality of sensors, a plurality of sensor data logs corresponding to surroundings of the autonomous vehicle;
 identifying one or more events within each of the plurality of sensor data logs;
 identifying a property of a plurality of different properties of the machine learning model that is to be trained;
 identifying a first event of the one or more events which is missing or under-represented in training data for training the identified property of the machine learning model;
 for each sensor data log of the plurality of sensor data logs associated with the identified first event:
  analyzing features of the identified one or more events within that sensor data log for determining whether that sensor data log satisfies one or more usefulness criteria for training the identified property of the machine learning model by comparing a first event identified using a first sensor data log collected by a first sensor of the plurality of sensors and a corresponding event identified using a second sensor data log collected by a second sensor of the plurality of sensors, wherein the features comprise at least spatial features,
  analyzing whether a difference between the first event and the corresponding event is more than a threshold,
  determining that the first sensor data log and the second sensor data log are not spatially inconsistent if the difference between the first event and the corresponding event is less than the threshold, and
  determining that the first second data log or the second sensor data log does not satisfy the one or more usefulness criteria for training the machine learning model if the statistical fit of the machine learning model indicates overfitting;
  in response to determining that that sensor data log satisfies one or more usefulness criteria for training the machine learning model, transmitting that sensor data log to a remote computing device for training the machine learning model;
 performing operations by a control system to control, using the machine learning model trained using the transmitted sensor data log, movement of the autonomous vehicle along a navigation route;

receiving information relating to an effectiveness of the sensor data log in training the machine learning model; and modifying, based on the received information, a weight or frequency of use associated with at least one data log selection strategy of a plurality of different data log selection strategies that can be used during said analyzing features.

7. The method of claim 1, wherein:

the features comprise temporal features;

analyzing features of the identified one or more events within that sensor data log for determining whether that sensor data log satisfies the one or more usefulness criteria for training the identified property of the machine learning model comprises identifying an event using a first sensor data log collected by a first sensor of the plurality of sensors; and the method further comprises determining whether the first event can be identified using a second sensor data log collected by the first sensor immediately after collection of the first sensor data log.

8. The method of claim 7, further comprising:

determining that the first sensor data log and the second sensor data log are temporally inconsistent if the event cannot be identified using the second sensor data log; and determining that the first sensor data log or the second sensor data log satisfies the one or more usefulness criteria for training the identified property of the machine learning model if an actual accuracy of the machine learning model will improve upon training using temporally inconsistent first and second sensor data logs.

9. The method of claim 7, further comprising:

determining that the first sensor data log and the second sensor data log are not temporally inconsistent if the event can be identified using the second sensor data log; and determining that the first sensor data log or the second sensor data log does not satisfy the one or more usefulness criteria for training the identified property of the machine learning model if the statistical fit of the machine learning model indicates overfitting.

10. The method of claim 1, wherein:

the features comprise bounding box inconsistencies;

analyzing features of the identified one or more events within that sensor data log for determining whether that sensor data log satisfies the one or more usefulness criteria for training the identified property of the machine learning model comprises identifying an object within a bounding box using a first sensor data log collected by a first sensor of the plurality of sensors; and the method further comprises:

tracking the object for predicting a bounding box for the object in a second sensor data log collected by the first sensor immediately after collection of the first sensor data log, and determining whether the object can be identified within the predicted bounding box using the second sensor data log.

11. The method of claim 10, further comprising:

determining that the first sensor data log and the second sensor data log include bounding box inconsistencies if the object cannot be identified within the predicted bounding box using the second sensor data log; and determining that the first sensor data log or the second sensor data log satisfies the one or more usefulness criteria for training the machine learning model if an actual accuracy of the machine learning model will improve upon training using the first and second data logs with bounding box inconsistencies.

12. The method of claim 10, further comprising:

determining that the first sensor data log and the second sensor data log do not include bounding box inconsistencies if the object can be identified within the predicted bounding box using the second sensor data log; and determining that the first sensor data log or the second sensor data log does not satisfy the one or more usefulness criteria for training the machine learning model if the statistical fit of the machine learning model indicates overfitting.

13. The method of claim 1, wherein:

the features comprise map-based features;

analyzing features of the identified one or more events within that sensor data log for determining whether that sensor data log satisfies one or more usefulness criteria for training the identified property of the machine learning model comprises determining that an event identified using that sensor data log violates the map-based features; and the method further comprises determining that the sensor log satisfies the one or more usefulness criteria when it violates the map-based features.

14. The method of claim 1, further comprising:

receiving, from the remote server, information relating to an effectiveness of that sensor data log for training the machine learning model; and updating, using the received information, the analyzing of features of the identified one or more events within a subsequently received sensor data log for determining whether the subsequently received sensor data log satisfies the one or more usefulness criteria for training the machine learning model.

15. A system for on-board selection of data logs for training a machine learning model comprising:

an autonomous vehicle comprising:

a plurality of sensors, a processor, and a non-transitory computer-readable medium comprising one or more programming instructions that when executed by the processor, cause the processor to:

receive, from the plurality of sensors, a plurality of sensor data logs corresponding to surroundings of the autonomous vehicle, identify one or more events within each of the plurality of sensor data logs, identify a property of a plurality of different properties of the machine learning model that is to be trained, identify a first event of the one or more events which is missing or under-represented in training data for training the identified property of the machine learning model, for each second data log of the plurality of sensor data logs associated with the identified first event:

analyze features of the identified one or more events within that sensor data log for determining whether that sensor data log satisfies one or more usefulness criteria for training the identified property of the machine learning model by comparing a first event identified using a first sensor data log collected by a first sensor of the plurality of sensors and a corresponding event identified using a second sensor data log collected by a second sensor of the plurality of sensors, wherein the features comprise at least spatial features, analyze whether a difference between the first event and the corresponding event is more than a threshold, determine that the first sensor data log and the second sensor data log are spatially inconsistent if the difference between the first event and the corresponding event is more than the threshold, determine that the first sensor data log or the second sensor data log satisfies the one or more usefulness criteria for training the identified property of the machine learning model if an actual accuracy of the machine learning model will improve upon training using spatially inconsistent first sensor data log and second sensor data log, and in response to determining that that sensor data log satisfies the one or more usefulness criteria for training the machine learning model, transmit that sensor data log to a remote computing device for training the machine learning model, and control, using the machine learning model trained using the transmitted sensor data log, movement of the autonomous vehicle;

receive information relating to an effectiveness of the sensor data log in training the machine learning model; and modify, based on the received information, a weight or frequency of use associated with at least one data log selection strategy of a plurality of different data log selection strategies that can be used during an analysis of the features of the identified one or more events.

16. The system of claim 15, further comprising programming instructions that when executed by the processor, cause the processor to: in response to determining that that sensor data log does not satisfy one or more usefulness criteria for training the identified property of the machine learning model, discard that sensor data log.

17. The system of claim 15, wherein the programming instructions, that when executed by the processor cause the processor to analyze the features, comprise:

check a consistency of ones of the features related to the identified events within ones of the plurality of sensor data logs that were acquired using at least two sensors of a same sensor modality or different sensor modalities;

assign a label of a plurality of different labels to the sensor data log based on the consistency; and basing said determining whether that sensor data log satisfies one or more usefulness criteria at least on the label.

18. The system of claim 15, wherein:
the features comprise temporal features;
the programming instructions that cause the processor to analyze features of the identified one or more events within that sensor data log for determining whether that sensor data log satisfies the one or more usefulness criteria for training the identified property of the machine learning model comprises identifying an event using first sensor data log collected by a first sensor of the plurality of sensors; and the system further comprises programming instructions that when executed by the processor, cause the processor to:

determine whether the first event can be identified using a second sensor data log collected by the first sensor immediately after collection of the first sensor data log, determine that the first sensor data log and the second sensor data log are temporally inconsistent if the first event cannot be identified using the second sensor data log, and determine that the first data log or the second data log satisfies the one or more usefulness criteria for training the identified property of the machine learning model if an actual accuracy of the machine learning model will improve upon training using temporally inconsistent first and second data logs.

19. The system of claim 15, wherein:
the features comprise bounding box inconsistencies;
the programming instructions that cause the processor to analyze features of the identified one or more events within that sensor data log for determining whether that sensor data log satisfies the one or more usefulness criteria for training the machine learning model comprises identifying an object within a bounding box using first sensor data log collected by a first sensor of the plurality of sensors; and the system further comprises programming instructions that when executed by the processor, cause the processor to:

track the object for predicting a bounding box for the object in a second sensor data log collected by the first sensor immediately after collection of the first sensor log, determine whether the object can be identified within the predicted bounding box using the second sensor data log, determine that the first sensor data log and the second sensor data log include bounding box inconsistencies if the object cannot be identified within the predicted bounding box using the second sensor data log, and determine that the first sensor data log or the second sensor data log satisfies the one or more usefulness criteria for training the identified property of the machine learning model if an actual accuracy of the machine learning model will improve upon training using first and second data logs with bounding box inconsistencies.

20. The system of claim 15, wherein:
the features comprise map-based features;
the programming instructions that cause the processor to analyze features of the identified one or more events within that sensor data log for determining whether that sensor data log satisfies one or more usefulness criteria for training the identified property of the machine learning model comprises determining that an event identified using that sensor data log violates the map-based features; and the system further comprises programming instructions that when executed by the processor, cause the processor to determine that the sensor log satisfies the one or more usefulness criteria when it violates the map-based features.

21. The system of claim 15, further comprising programming instructions that when executed by the processor, cause the processor to:
- receive, from a remote server, information relating to an effectiveness of that sensor data log for training the machine learning model; and
- update, using the received information, the analyzing of features of the identified one or more events within a subsequently received sensor data log for determining whether the subsequently received sensor data log satisfies the one or more usefulness criteria for training the machine learning model.

22. The method of claim 1, further comprising, at the remote computing device:
- receiving the transmitted sensor data log; and
- using the transmitted sensor data log for training the machine learning model.

\* \* \* \* \*